March 14, 1944.  A. L. HANNON  2,344,207
SHUTTER CONTROL WITH PRESSURE COMPENSATION
Filed Sept. 29, 1942   3 Sheets-Sheet 1

Inventor:
ANDREW L. HANNON,
By
Attorney.

March 14, 1944.    A. L. HANNON    2,344,207
SHUTTER CONTROL WITH PRESSURE COMPENSATION
Filed Sept. 29, 1942    3 Sheets-Sheet 3

Inventor:
ANDREW L. HANNON,
By
Attorney.

Patented Mar. 14, 1944

2,344,207

UNITED STATES PATENT OFFICE 2,344,207

SHUTTER CONTROL WITH PRESSURE COMPENSATION

Andrew L. Hannon, Los Angeles, Calif., assignor to The Garrett Corporation, Airesearch Manufacturing Company Division, Inglewood, Calif., a corporation of California Application September 29, 1942, Serial No. 460,133

6 Claims. (Cl. 257—2)

My invention relates to control means for oil coolers and relates in particular to a device incorporating means for directing oil through the passages of the cooler and a control unit which is responsive to both changes in temperature and pressure of oil in the cooler.

Although the invention may be used in conjunction with various types of coolers for cooling of liquids which undergo change of viscosity as the temperature thereof is changed, the invention is of especial utility with coolers used in aircraft for the cooling of the oil employed to lubricate the internal parts of the aircraft engine. In these coolers the oil to be cooled is passed through relatively narrow spaces and the heat absorbing effect of the coolers is ordinarily achieved by passing air through tubes which define the oil flow spaces in the cooler and are in direct contact with the oil flowing therein. It will be understood that this heat absorbing effect, or, in other words, the capacity of the cooler to absorb heat, may be varied by changing the rate of flow of the air through the tubes of the cooler, and that the flow of air may be controlled by a thermostat responsive to temperature changes in the cooler, this being ordinarily done by placing the thermostat in the path of the flow of cooled oil leaving the cooler, for it is ordinarily the purpose of the oil cooler to reduce the temperature of the oil to a predetermined value.

Control of the heat absorbing effect of the cooler by temperature alone would be entirely satisfactory were it not for congealing of oil on tube surfaces within the cooler, which congealing acts in a manner to defeat the purpose of the thermostat control. It is found, in the operation of coolers on aircraft, that oil will congeal on surfaces of at least a portion of the air tubes. These layers of congealed oil on the tubes act as insulators against transfer of heat from the hot oil to the tubes. Accordingly these layers of congealed oil reduce the heat absorbing capacity of the cooler as a whole, with the result that there is an increase in the temperature of the oil leaving the cooler. The thermostat control, ordinarily used, acts in response to this increase in temperature to increase the flow of air through the cooler, and the increase in air flow, although it may increase the cooling effect in those parts of the cooler which are not congealed, causes an increase in the thickness of the layers of congealed oil in those portions of the cooler wherein the congealing effect has started and also causes an increase in area of tube surface on which oil has become congealed. Naturally, as the extent of congealment within the cooler increases, the heat absorbing capacity of the cooler decreases, and there is a corresponding rise in the temperature of the oil stream leaving the cooler, the ultimate effect of the foregoing ordinarily resulting in the progressive development of such a large area of congealment within the cooler that the oil discharged through the outlet of the cooler will be nearly as hot as when it enters the cooler, even though the thermostat has responded to the temperature increase to completely open the air flow control to its fullest capacity.

It is an object of this invention to provide a control device for an oil cooler embracing a support and a control member rotatably supported therein, and means for producing forward relative rotation of the control member in response to increase in temperature of the oil leaving the cooler, and for producing rearward relative rotation of the control part in response to increase in pressure within the oil cooler, or increase in pressure differential between the inlet and outlet portions of the oil cooler, resulting from the restriction of oil passages within the cooler caused by the thickening or congealing of oil therein. By this arrangement of parts an increase in temperature of the oil flowing from the cooler will act to produce forward relative rotation of the control member and the support, this forward relative rotation resulting in an opening of the air valve means associated with the cooler so as to increase the air flow therethrough. However, an increase in the oil pressure within the cooler, indicative of partial congealment or thickening of oil within the cooler, will act to produce reverse relative rotation of the control member and its support to offset the forward rotational effect produced by the increase in the temperature of the oil leaving the cooler. By use of both temperature and pressure in the control device, as hereinabove set forth, a small initial congealing of oil will not produce an increase in air flow through the cooler so as to increase the congealing of oil which has already taken place, but will restrain the air flow in such a manner that the congealing effect will be prevented from spreading and the congealed area will be permitted to thaw out, thereby restoring the cooler to normal efficiency.

A further object of the invention is to provide a thermostat mounted on a rotatable base, in a position exposed to a flow of oil, and means responsive to pressure changes for rotating the base, so that the controlling effect of the thermostat will be modified by such pressure changes.

It is a further object of the invention to provide a control device for an oil cooler having an inlet chamber associated with the inlet portion of the cooler and an outlet chamber which receives oil which has passed through the cooler, means rotatably supporting a thermostat in the outlet passage, and a movable wall, one face of which is exposed to pressure in the inlet space or chamber of the device, and the other face of which is exposed to pressure in the outlet passage, this movable wall being connected to the support for the thermostat so as to rotate the same in a manner to bodily rotate the thermostat.

Further objects and advantages of the invention will be brought out in the following part of the specification.

Referring to the drawings which are for illustrative purposes only,

Fig. 5 is a fragmentary cross-section taken as indicated by the line 5—5 of Fig. 1.

Figure 1:
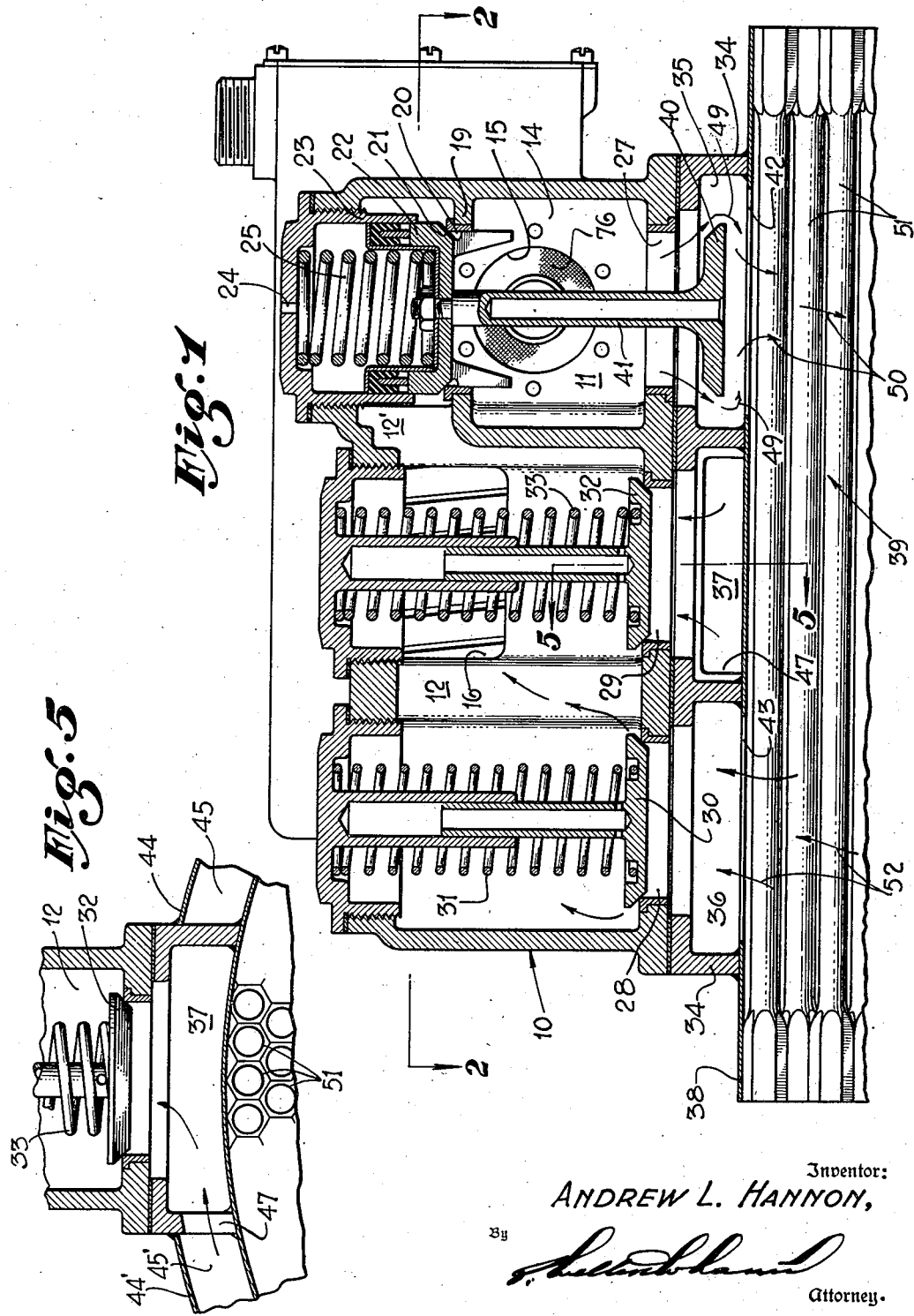
Fig. 1 is a sectional view of a preferred embodiment of my invention mounted on the upper portion of a cooler, this section being taken as indicated by the line 1—1 of Fig. 2.
Figure 2:
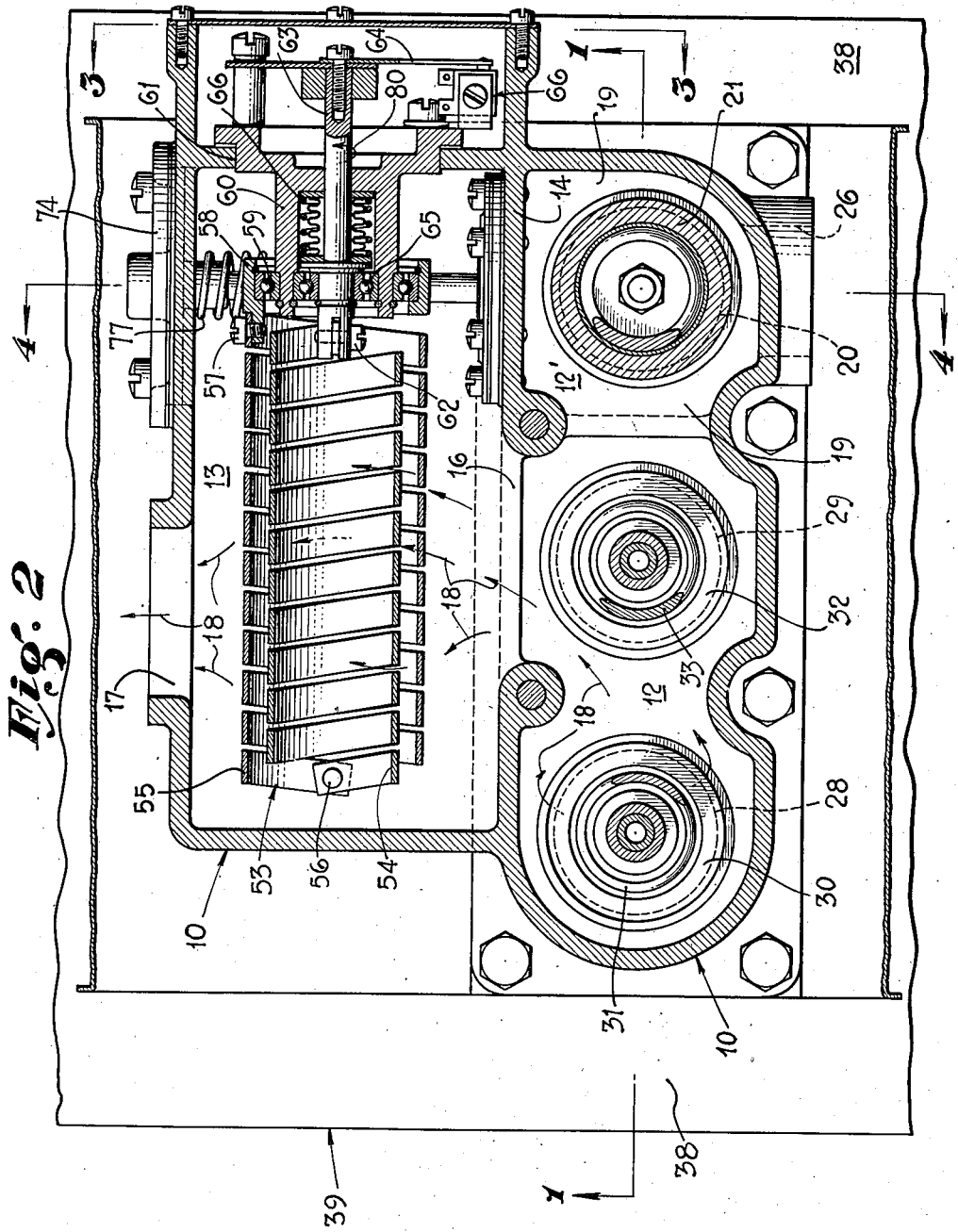
Fig. 2 is a sectional view taken on the horizontal plane indicated by the line 2—2 of Fig. 1.
Figure 3:
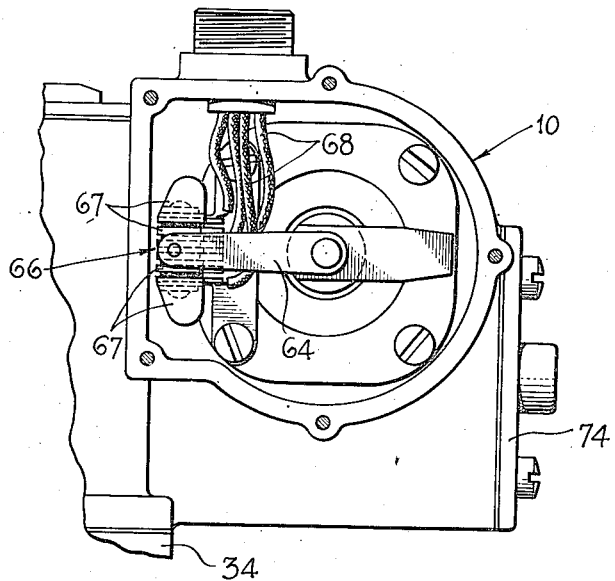
Fig. 3 is a fragmentary elevational view taken as indicated by the line 3—3 of Fig. 2.

The form of the invention shown has a casing 10 enclosing an inlet chamber 11, a valve chamber 12, and a thermostat chamber 13. The thermostat chamber is so positioned that it is separated from the inlet chamber 11 by a wall 14 having therein an opening 15. As best shown in Fig. 2, the valve chamber 12 and the thermostat chamber 13 are connected by an opening 16 so that these two chambers 12 and 13 comprise the outlet passage of the device. During the normal operation of the device, oil flows from the valve chamber 12 and through the thermostat chamber to the outlet opening 17 of the casing 10 as indicated by the arrows 18 of Fig. 2. As shown in Figs. 1 and 2, the rightward portion 12' of the valve chamber 12 extends above the inlet chamber 11, and in the upper portion of the wall 19, which separates the chambers 11 and 12, there is a relief port 20 normally closed by a valve 21 disposed at the lower end of a piston 22, which is vertically slidable in a cylinder 23 which is in open communication with the external atmosphere through an opening 24. The valve 20 is urged toward the closed position in which it is shown in Fig. 1 by a spring 25.

The casing 10 in its side wall provides an inlet opening 26 communicating with the inlet chamber 11, which opening may be connected to the hot oil piping through which the oil to be cooled is pumped. In the lower wall of the inlet chamber 11 there is a port 27, and in the lower wall of the valve chamber 12 there are ports 28 and 29. A check valve 30 is yieldably held in a position to close the port 28 by a relatively light spring 31, and a bypass valve 32 is held in a position to close the port 29 by a spring 33 of such strength as to resist opening of the valve 32 until the pressure of oil against the lower face of the valve 32 reaches a predetermined bypass pressure, which pressure may range between fifty and seventy-five pounds in the general use of the invention. A protective valve 40 is supported below the port 27 by a stem 41 which projects down from the piston 22 whereby the valve 40 will be raised into a position to close the port 27 when fluid pressure against the lower face of the valve 21 raises the piston 22 against the force of the spring 25.

Figure 4:
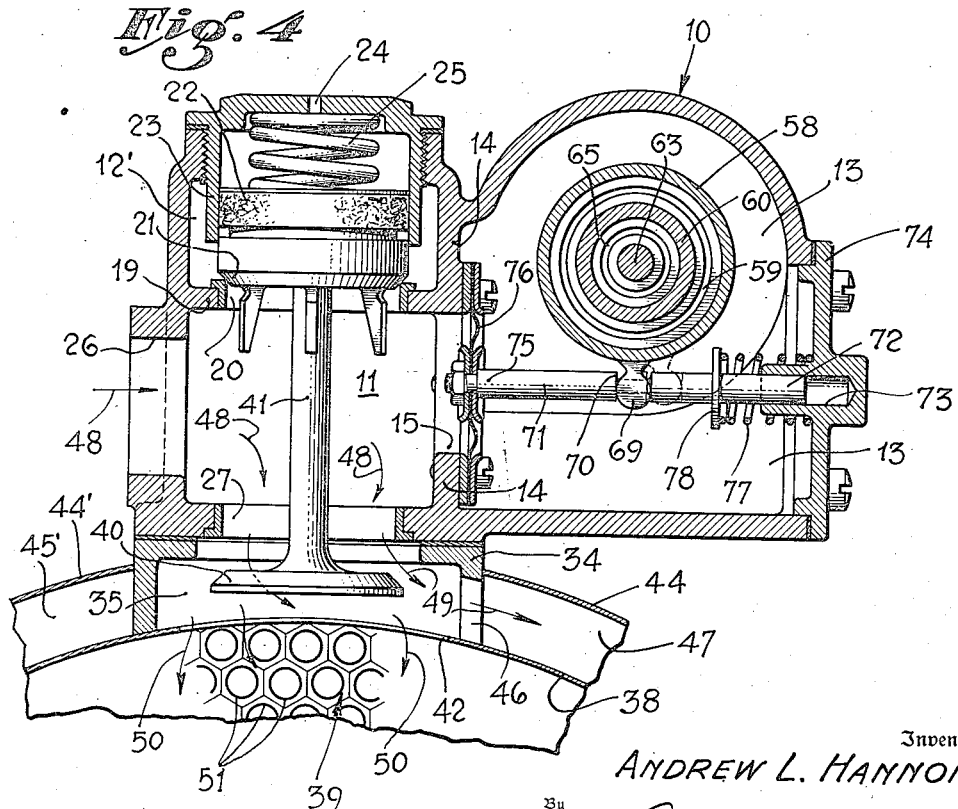
Fig. 4 is a cross-section taken as indicated by the line 4—4 of Fig. 2.

As shown in Figs. 1, 4, and 5, the casing 10 may be secured to a fitting 34 having chambers 35, 36, and 37 communicating directly with the ports 27, 28 and 29 of the casing 10, previously described herein. This fitting 34 is secured to the shell 38 of an oil cooler 39, only a fragment of which is shown, for the reason that the general type of oil cooler with which the invention is used is well known to the art. The shell 38 has a cooler inlet port 42, Figs. 1 and 4, communicating with the chamber 35 of the fitting 34, and has a cooler outlet port 43, Fig. 1, communicating with the chamber 36 of the fitting 34. As shown in Fig. 4, a wall 44 extends from the rightward face of the fitting 34 in spaced relation to the shell 38. In accordance with known oil cooler construction, this wall 44 extends entirely around the exterior of the shell 38 and as shown at 44' in Fig. 4 is connected to the left side of the fitting 34, thereby forming around the exterior of the shell 38 an oil space 45, often referred to as the warm-up muff of the cooler. The fitting 34 provides a port 46 connecting the chamber 35 with one portion of the space 45, and, as shown in Fig. 5, provides a port 47 which connects another portion 45' of the warm-up space 45 with the chamber 37 of the fitting 34.

In the normal operation of the cooler, the hot oil to be cooled flows into the inlet chamber 11 and then down through the port 27 into the chamber 35, as indicated by arrows 48 in Fig. 4. As shown in Figs. 1 and 4, this hot oil then passes around the valve 40, as indicated by arrows 49, and then through the cooler inlet 42 into the interior of the cooler 39, as indicated by arrows 50. The oil then flows through the spaces within the cooler existing between the air tubes 51 thereof, and finally leaves the cooler through the cooler outlet, as indicated by arrows 52 in Fig. 1. The oil passes through the chamber 36 of the fitting 34, and lifting the valve 30 which rests across the port 28, passes into the valve chamber and then takes the course indicated by the arrows 18 in Fig. 2. During an initial starting period, as for example, just after the engines have remained inactive for a period of time sufficient to permit the oil to congeal or become sluggish within the cooler 39, the back pressure built up in the cooler inlet port 42 and in the warm-up space 45 may be sufficient to open the bypass valve 32, so that there will be a direct flow of oil through the warm-up space 45, the chamber 37, and the port 29 into the valve chamber 12 which forms a part of the outlet passage of the device.

In the thermostat chamber 13 there is a thermostat 53, consisting of inner and outer helixes 54 and 55 of bimetallic thermostat stock. The outer ends of the helixes 54 and 55 are connected by a rivet 56. The inner or rightward end of the outer helix 55 is connected by a screw 57 with a rotatable support 58 carried by a bearing 59 at the inner end of a tubular support 60 which is secured in an opening 61 in the shell or casing 10 of the control device. The rightward end of the inner helix 54 is secured by connecting means 62 with a rotary member or control part comprising a shaft 63 and an arm 64. The shaft 63 and the arm 64 are supported for relative rotation in the support 60 by a bearing 65, and sealing means 66 of suitable type are placed around the shaft 63 within the support 60. The form of control means disclosed has been adopted for the purpose of illustrating the general principles involved in the use of both temperature and pressure. The arm 64 is shown as the moving contact of a control switch 66 of the type disclosed in my copending application, Serial No. 430,949, filed February 14, 1942, for Control device for oil coolers, now Patent No. 2,314,937, dated March 30, 1943. This control switch 66 has a plurality of contacts 67 to which the conductors 68 of the control circuit shown in the copending application are connected.

As shown in Fig. 4, the rotatable support or base 58 for the thermostat 53 has a downwardly projecting lever 69 which engages a notch 70 in a bar 71, one end 72 of which is slidably received in a guide opening 73 carried by a plate 74 which is removably secured to the casing 10, and the other end 75 of which bar 71 is connected to a movable wall 76 which extends across the opening 15 so that the left face of this movable wall will be exposed to pressure in the inlet chamber 15 and the right face of the movable wall 76 will be exposed to the outlet pressure existing in the thermostat chamber 13. The movable wall 76 is shown as a diaphragm 76. Rightward movement of the diaphragm 76 and of the bar 71 is resisted by a compression spring 77, one end of which engages a collar 78 on the bar 71.

Deformation of the thermostat 53 due to a rise in temperature therein transmits rotation to the shaft 63 in the direction of the arrow 80 in Fig. 2, or in clockwise direction when the shaft is viewed from its right hand end as in the cross section, Fig. 4. Increase in pressure in the inlet chamber 11 moves the bar 71 rightward and through the lever or projection 69 transmits counterclockwise rotation to the rotatable support 58, and this counterclockwise rotation will be transmitted to the thermostat. Whether this counterclockwise rotation is carried by the thermostat to the shaft, or the degree of rotation transmitted through the thermostat to the shaft, will depend upon the torsional change which may take place in the thermostat due to change in temperature to which it is subjected. Ordinarily the spring 77 is of such strength that counterclockwise rotation of the rotatable base 58 in response to a pressure increase in the cooler will be greater than the torsion produced in the thermostat by the rise in temperature of the oil resulting from partial congealment of oil in the cooler which has produced the increase in pressure. Therefore, the summation of the effects of the rise in temperature and increase in pressure in the cooler will have the net result of a rotation of the shaft in rearward or counterclockwise direction so that the control will act to diminish the flow of air through the cooler tubes so as to warm the cooler slightly and cause a thawing out of the congealed oil therein, to normalize the pressure condition in the cooler, whereupon the heat absorbing characteristics of the cooler will continue for a period of time under control of the thermostat. In this way the control acts to anticipate and prevent excessive congealing of oil in the cooler.

I claim as my invention:

1. In a control device for an oil cooler, the combination of: a torsional thermostat having one end thereof mounted on a rotatable support; a control member connected to the other end of said thermostat, said control member being moved in forward direction by said thermostat when said thermostat is subjected to a rise in temperature; a movable wall; means connected to the inlet of said cooler for applying pressure to said movable wall to move the same in response to an increase in pressure in said cooler; and means connecting said movable wall to a peripheral portion of said rotatable support to rotate the same in reverse direction relatively to said forward direction when said movable wall is moved in response to an increase in pressure in said cooler.

2. In a control device for an oil cooler, the combination of: a torsional thermostat having one end thereof mounted on a rotatable support; a control member connected to the other end of said thermostat, said control member being moved in forward direction by said thermostat when said thermostat is subjected to a rise in temperature; a movable wall; means connected to the interior of said cooler at a point ahead of its outlet for applying pressure to said wall to move the same in response to an increase in pressure in said cooler; and means connecting said flexible wall to a peripheral portion of said rotatable support to rotate the same in reverse direction relatively to said forward direction when said flexible wall is moved in response to an increase in pressure in said cooler.

3. In a control device for an oil cooler, the combination of: a torsional thermostat having one end thereof mounted on a rotatable support; a lever projecting from said rotatable support in a radial plane; a control member connected to the other end of said thermostat, said control member being moved in forward direction by said thermostat when said thermostat is subjected to a rise in temperature; a movable wall; means connected to the inlet of said cooler for applying pressure to said movable wall to move the same in response to an increase in pressure in said cooler; and means connecting said movable wall to said lever of said rotatable support to rotate the same in reverse direction relatively to said forward direction when said movable wall is moved in response to an increase in pressure in said cooler.

4. In a control device for an oil cooler, the combination of: a torsional thermostat having one end thereof mounted on a rotatable support; a control member connected to the other end of said thermostat, said control member being moved in forward direction by said thermostat when said thermostat is subjected to a rise in temperature; a movable wall, said movable wall being movable back and forth along a line of movement situated in a plane which is disposed at an angle and in crossing relation to the axis of rotation of said rotatable support; means connected to the inlet of said cooler for applying pressure to said movable wall to move the same in response to an increase in pressure in said cooler; and means connecting said movable wall to a peripheral portion of said rotatable support to rotate the same in reverse direction relatively to said forward direction when said movable wall is moved in response to an increase in pressure in said cooler, said rearward rotation of said rotatable support being of such magnitude as to at least offset the effect of said thermostat acting in response to the rise in the temperature of the oil leaving the cooler, normally occurring in conjunction with the pressure increase in the cooler.

5. In a control device for an oil cooler, the combination of: a casing having an oil inlet chamber for connection to the inlet of the cooler and an oil outlet chamber for connection to the oil outlet of the cooler, there being an opening between said chambers; a movable wall crossing said opening and adapted to be moved by the pressure differential between said inlet and outlet chambers; an operating member in said outlet chamber connected to said movable wall so as to be reciprocated thereby; a thermostat in said outlet chamber; a control member and a cooperating support arranged for relative rotation in forward direction by said thermostat when the temperature of said thermostat is raised; and lever means acting between said thermostat and said support, said lever means being engaged and moved by said operating member so as to produce relative rearward rotation of said control member and said support in response to an increase in the pressure differential between said inlet and outlet chambers.

6. In a control device for an oil cooler, the combination of: a casing having an oil inlet chamber for connection to the inlet of the cooler and an oil outlet chamber for connection to the oil outlet of the cooler, there being an opening between said chambers; a flexible wall crossing said opening and adapted to be moved by the pressure differential between said inlet and outlet chambers; an operating member in said outlet chamber connected to said flexible wall so as to be reciprocated thereby; a thermostat in said outlet chamber; a control member and a cooperating support arranged for relative rotation in forward direction by said thermostat when the temperature of said thermostat is raised; and lever means acting between said thermostat and said support, said lever means being engaged and moved by said operating member so as to produce relative rearward rotation of said control member and said support in response to an increase in the pressure differential between said inlet and outlet chambers.

ANDREW L. HANNON.